United States Patent
Leigh et al.

(10) Patent No.: US 12,076,915 B2
(45) Date of Patent: Sep. 3, 2024

(54) REDUCING CAKING OF BUILD MATERIAL

(71) Applicant: Hewlett-Packard Development Company, L.P., Spring, TX (US)

(72) Inventors: Stan E. Leigh, Corvallis, OR (US); Karsten N. Wilson, Corvallis, OR (US); Anthony Holden, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 71 days.

(21) Appl. No.: 17/417,993

(22) PCT Filed: May 29, 2019

(86) PCT No.: PCT/US2019/034276
§ 371 (c)(1),
(2) Date: Jun. 24, 2021

(87) PCT Pub. No.: WO2020/242462
PCT Pub. Date: Dec. 3, 2020

(65) Prior Publication Data
US 2022/0072768 A1 Mar. 10, 2022

(51) Int. Cl.
*B29C 64/153* (2017.01)
*B29C 64/205* (2017.01)
(Continued)

(52) U.S. Cl.
CPC .......... *B29C 64/153* (2017.08); *B29C 64/205* (2017.08); *B29C 64/264* (2017.08);
(Continued)

(58) Field of Classification Search
None
See application file for complete search history.

(56) References Cited

U.S. PATENT DOCUMENTS

| | | | |
|---|---|---|---|
| 2006/0071367 A1 | 4/2006 | Hunter et al. | |
| 2011/0249047 A1 | 10/2011 | De Joseph et al. | |
| | (Continued) | | |

FOREIGN PATENT DOCUMENTS

| | | |
|---|---|---|
| CN | 106232331 A | 12/2016 |
| CN | 109070463 A | 12/2018 |
| | (Continued) | |

*Primary Examiner* — Yung-Sheng M Tsui
*Assistant Examiner* — Melody Tsui
(74) *Attorney, Agent, or Firm* — Michael Dryja

(57) ABSTRACT

According to one aspect, there is provided a method of selectively solidifying successive layers of build material in a 3D printing system. The method comprises obtaining data relating to a 3D object to be generated, forming a layer of build material on a build platform, applying to the formed layer a pattern of fusing agent corresponding to a portion of the layer to be solidified to form a layer of the object, applying to the formed layer a pattern of anti-caking agent on portions of the formed layer that are not to be solidified to form a layer of the object, and applying energy to the whole of the formed layer to cause portions of the layer on which fusing agent was applied to heat up, melt, coalesce, and then solidify upon cooling, and to cause portions of the formed layer on which anti-caking agent was applied to control caking of build material in those portions.

9 Claims, 3 Drawing Sheets

(51) Int. Cl.
*B29C 64/264* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2017/0151722 A1 | 6/2017 | Prasad et al. |
| 2018/0022923 A1 | 1/2018 | Emamjomeh et al. |
| 2019/0030800 A1 | 1/2019 | Rudisill et al. |
| 2019/0134898 A1 | 5/2019 | Zhao et al. |
| 2019/0176390 A1 | 6/2019 | White et al. |

FOREIGN PATENT DOCUMENTS

| | | | |
|---|---|---|---|
| CN | 109476076 A | 3/2019 | |
| EP | 3208077 A1 | 8/2017 | |
| EP | 3455055 A1 | 3/2019 | |
| WO | WO-2015108546 A2 | 7/2015 | |
| WO | 2017/007486 A1 | 1/2017 | |
| WO | WO-2017069778 A1 | 4/2017 | |
| WO | 2017/162306 A1 | 9/2017 | |
| WO | 2017/196330 A1 | 11/2017 | |
| WO | WO-2017196344 A1 | 11/2017 | |
| WO | WO-2017196353 A1 * | 11/2017 | ........... B29C 64/165 |
| WO | WO-2018022034 A1 | 2/2018 | |
| WO | WO-2018144031 A1 | 8/2018 | |
| WO | WO-2018182629 A1 | 10/2018 | |
| WO | WO-2018199994 A1 | 11/2018 | |
| WO | WO-2018199998 A1 | 11/2018 | |

* cited by examiner

REDUCING CAKING OF BUILD MATERIAL

BACKGROUND

Some three-dimensional (3D) printing systems form a layer of a particulate build material, such as a powdered build material, on a build platform, apply an energy absorbing fusing agent to portions of the layer to corresponding to a layer of an object to be generated, and then apply energy to the formed layer to cause portions of the layer on which fusing agent was applied to heat up, coalesce, and solidify upon cooling. Such systems may additionally apply a detailing, or cooling, agent adjacent to object surfaces to prevent heat from portions of build material on which fusing agent was applied from heating up sufficiently to coalesce and solidify.

BRIEF DESCRIPTION

Examples will now be described, by way of non-limiting example only, with reference to the accompanying drawings, in which.

DETAILED DESCRIPTION

Some 3D printing systems apply fusing energy, such as heat, generally uniformly over each formed layer of build material. The build material used in such systems is generally light in colour (such as white, or a colour close to white) and is a poorer absorber of fusing energy than portions of the build material on which a fusing agent is applied. This energy absorption selectivity allows, upon application of fusing energy, those portions of a layer on which fusing agent is applied to heat up sufficiently to coalesce or melt, whilst portions of the layer on which no fusing agent is applied do not heat up sufficiently to coalesce or melt.

Different build materials have different chemical and physical properties. It has been observed that some build materials on which no fusing agent is applied remain largely free-flowing after being subjected to fusing energy, whereas other types of build material exhibit what is generally known as 'caking'. Caking is where individual particles of a particulate build material become bound together, or agglomerate, under the application of fusing energy (and in the absence of fusing agent). Some build materials exhibit relatively weak caking bonds, whereas other materials exhibit relatively stronger caking bonds.

Build material caking complicates the process of separating non-solidified build material from 3D objects formed from solidified build material. For example, a build material cake may need to be mechanically, or manually, cracked open to allow access to 3D printed objects formed in the cake, and caked build material may have to be mechanically processed, for example using sieves, before it can be reused in the generation of further 3D objects.

Herein, the term 'solidified build material' is used to refer to build material that has coalesced and has solidified to form an intended part of a 3D object generated by the printer 100. It is not used to refer to build material that has undergone caking and which does not form an intended part of a 3D object generated by the printer 100.

Examples described herein provide a method and apparatus to reduce build material caking during the generation of 3D objects.

Figure 1:
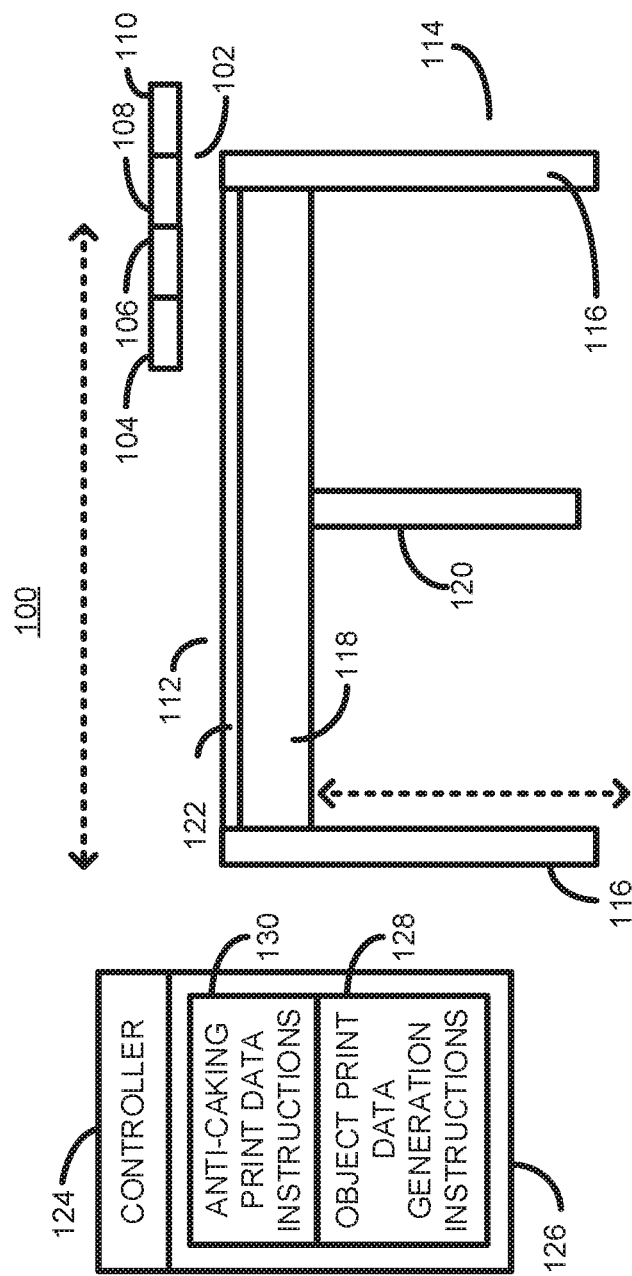
FIG. 1 is a side view of a simplified 3D printer according to an example.

Referring to FIG. 1, there is shown a side view of a simplified 3D printer according to an example. The example printer 100 comprises a carriage 102 on which is mounted a recoater 104, such as a wiper or a roller, to form a layer of build material in a print zone 112, an agent distributor, such as a printhead, 106 to print patterns of a fusing agent on a layer of build material formed in the print zone 112, an agent distributor, or printhead, 108 to print patterns of a detailing agent on a layer of build material formed in the print zone 112, and a fusing energy module 110 to apply fusing energy to a layer of build material formed in the print zone 112. The example printer 100 shown shows only one possible arrangement of the elements 104 to 110. In other examples the elements 104 to 110 may arranged differently, for example be arranged on one or multiple carriages, be provided multiple times (e.g. provide two or more fusing modules, etc.).

According to one example, a suitable fusing agent may be an ink-type formulation comprising carbon black, such as, for example, the fusing agent formulation commercially known as V1Q60A "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

The printer 100 may comprise a build unit 114. In one example the build unit 114 may be an integral part of the printer 100. In another example the build unit 114 may be a removal element of the printer 100, for example to allow the build unit to be transported between the printer 100 and one or multiple other processing stations. A processing station may comprise, for example, a de-caking, or unpacking, station, where 3D objects generated by the printer 100 are separated from non-solidified build material.

The build unit 114 comprises a build chamber formed by a housing 116 within which is located a vertically moveable build platform 118. The build chamber provides the volume within which 3D objects may be generated by the printer 100. The build platform 118 is moved by a drive mechanism, such as a piston or a lead screw, 120.

In one example, a build material dosing mechanism (not shown) provides a volume of build material at one side of the build platform 118, and is spread by the recoater 104 to form a layer 122 of build material having a thickness defined by the height at which the build platform 118 is positioned below the top of the housing 116.

Figure 2:
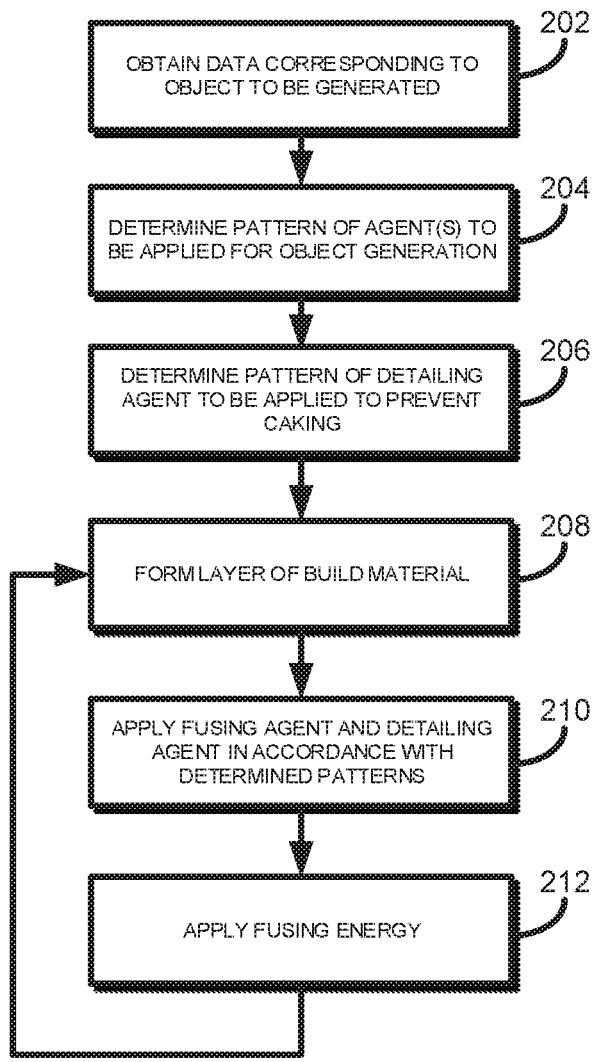
FIG. 2 is a flow diagram outlining a method of controlling a 3D printer according to an example.
Figure 3:
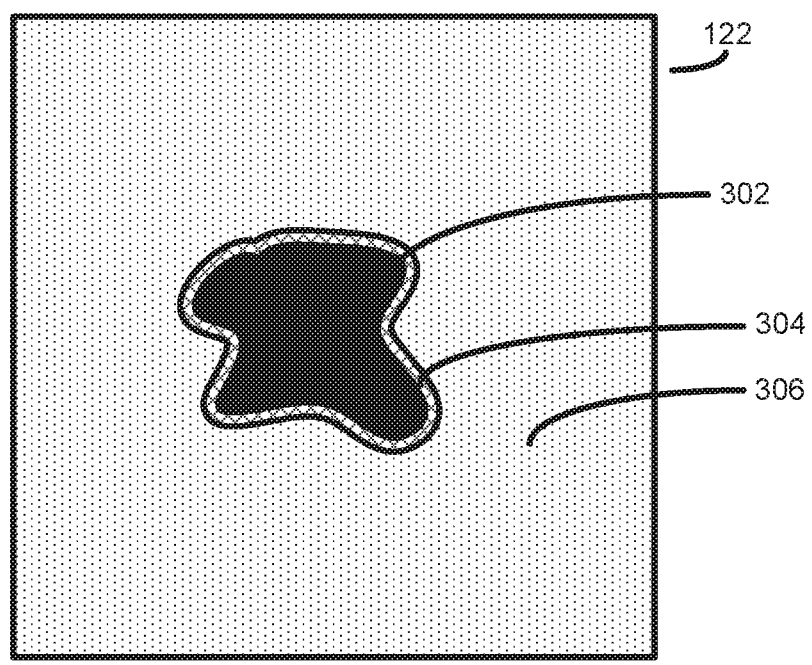
FIG. 3 is a top view illustration of a layer of build material and patterns of fusing agent and detailing agent.

Operation of the printer 100 is controlled by a printer controller 124, as described in further detail below with reference to the flow diagram of FIG. 2. The controller 124 comprises a memory 126 on which are stored object print data generation instructions 128, and anti-caking print data instructions 130. These instructions may be, for example, computer or controller understandable instructions that, when executed by the controller 124, cause the controller 124 to control the operation of the printer 100 as described below. Further reference is made to FIG. 3, which illustrates a plan view of a layer of build material formed on the build platform 118.

At block 202, the controller 124 obtains data corresponding to an object or set of objects to be generated by the printer 100. The data may be in any suitable format, such as in a 3MF data file, data representing a mesh of triangles, data representing a set of two-dimensional slices of an object or set of objects.

At block 204, the controller 124 processes the obtained object data and determines, for each of a set of layers of build material that are to be processed, a pattern of one or multiple agents to be applied to addressable locations on each layer of build material formed in the print zone 112 to generate a layer of the object.

In one example, the controller 124 may determine, based on the obtained object data, uniquely a pattern of fusing agent 302 to generate the object. In one example, based on the obtained object data, the controller 124 may determine a pattern of both fusing agent and detailing agent to generate a layer of the object.

For example, the controller 124 may determine, based on the obtained object data, a pattern of fusing agent 302 that is to be applied to each layer of build material in the print zone 112 based on portions of each layer of build material that are to be solidified to form a layer of a 3D object. The controller 124 may also, in one example, additionally determine a pattern of detailing agent 304 to be selectively applied to each layer of build material in the print zone 112 to control thermal bleed from a portion of build material on which fusing agent is applied. Control of thermal bleed may include, for example, a level of reduction of thermal bleed that ranges from substantial prevention of thermal bleed to an acceptable reduction in thermal bleed. Thermal bleed may, for example, occur when, after application of fusing energy, a portion of build material on which fusing agent is applied heats up, and a portion of this heat migrates, or bleeds, onto a portion of build material on which no fusing agent was applied. Thermal bleed may cause build material on which no fusing agent was applied to heat and coalesce, or at least partially coalesce, and adhere to the portion on which fusing agent was applied. Thermal bleed may, therefore, cause dimensional inaccuracy of the formed object, or may cause the surface finish of the object to have other quality defects.

The pattern 302 of fusing agent and the pattern 304 of detailing agent may be independent from each other.

In one example, the controller 124 may determine that the pattern of detailing agent 304 is to be applied immediately adjacent to the pattern of fusing agent 302. In another example, the controller 124 may determine that the pattern of detailing agent 304 is to be applied in close proximity to the pattern of fusing agent 302. In one example, detailing agent may be applied within a distance of about from 0.1 to 2 mm from the portion of detailing agent 304.

It should be noted that the controller 124 may determine that a pattern of fusing agent is only to be applied to layers of build material that have portions which are to form a layer of the 3D object to be generated. The controller 124 may, however, determine that a pattern of detailing agent 304 is to be applied above or below a layer of build material on which fusing agent is to be applied, for example to prevent or control thermal bleed between adjacent layers of build material.

The controller 124 may determine a contone level at which the pattern of detailing agent 304 is be applied. The purpose of the pattern of detailing agent 304 is to prevent, or at least to reduce, the effect of thermal bleed from energy absorbed by the pattern of fusing agent 302 once fusing energy is applied thereto. The contone level at which the pattern of detailing agent is applied may vary depending on the cooling effect of the detailing agent, the size of detailing agent drops ejected by the printhead 108, and other factors. Thermal bleed can cause build material that is not intended to form part of a 3D object to heat up sufficiently to coalesce, or at least partially coalesce, and to adhere to the surface of a 3D object. Detailing agent helps prevent build material from heating up sufficiently to coalesce, and thus helps improve the dimensional accuracy and surface finish of generated 3D objects. To prevent or reduce thermal bleed, the controller 124 may determine that the pattern of detailing agent 304 be applied at a relatively high density or contone level. After application of fusing energy, the portion of build material to which the pattern of detailing agent 304 is applied may remain generally non-solidified.

In some examples, the controller 124 may also determine a pattern (not shown) of detailing agent to be applied at the same locations as locations at which fusing agent may be applied. This may be done, for example, to prevent portions of build material on which fusing agent is applied from overheating.

As described above, the pattern 302 of fusing agent, or the pattern 302 of fusing agent and the pattern 304 of detailing agent, are used in the generation of the object.

At 206, the controller 124 determines a pattern 306 of detailing agent to be applied to control caking on build material that is not intended to form part of the 3D object (or objects) being generated. In one example, the pattern is to control caking on all build material in a layer that is not intended to form part of the 3D object (or objects) being generated. In another example, the pattern is to control caking on at least a portion of build material in a layer that is not intended to form part of the 3D object (or objects) being generated. In one example the portion may comprise greater than 50%, or greater than 60%, or greater than 70%, or greater than 80%, or greater than 90%, or greater than 95% of build material that is not intended to form part of the 3D object (or objects).

Control of caking may include, for example, substantial prevention of caking, or at least the reduction of caking to an acceptable degree of caking. An acceptable level of caking control, or a desired degree of reduction of caking may, for example, be based on techniques used to de-cake a print job. This pattern 306 of detailing agent is not used in the generation of the object. The controller 124 may determine a contone level at which the pattern of detailing agent 306 is to be applied. In one example, the contone level of the pattern of detailing agent 306 may be less than the determined contone level for the pattern of detailing agent 304. A higher contone level for the detailing agent pattern 306 may result in a reduced degree of caking compared to a lower contone level, at the expense of increased usage of detailing agent. Depending on particular needs, the contone level for the detailing agent pattern 306 may be chosen as a comprise between efficient use of detailing agent and ease of de-caking. The amount of detailing agent to be used in the pattern 306 may be based, for example, on properties of the type of build material used in the process, and may obtained, for example, through experimentation. In one example, the controller 124 may be obtain a type of build material to be used to generate the object, and may determine the pattern 306 of detailing agent to be used accordingly.

In one example, a contone level may be a density of detailing agent, for example, x picolitres of detailing agent per cm². In one example, the controller 124 may determine that no pattern 306 of detailing agent is to be applied to a particular layer of build material.

In another example, the controller 124 may determine that a first pattern 306 of detailing agent is to be applied to a first layer of build material, and a second different pattern 306 of detailing agent is to be applied to a second layer of build material, in such a way that the first and second patterns prevent, or at least reduce, caking on both the first and second layer. For example, a first pattern may comprise a first checkered pattern, and a second pattern may comprise a complementary checkered pattern. In this way, the amount of detailing agent that is to be applied to prevent or reduce caking may be reduced compared to if detailing agent is applied in a regular pattern. In other examples the controller 124 may determine other suitable patterns.

In a yet further example, the controller 124 may determine that detailing agent is to be applied to a successive layers of build material in a semi-random uniform distribution at a predetermined density, for example, at a 10% density, or a 20% density, or a 30% density, or a 40% density, or a 50% density, or a 60% density, or a 70% density, or an 80% density, or a 90% density.

In one example, the controller 124 determines the pattern of detailing agent 306 not to correspond with the pattern of detailing agent 302 nor with the pattern of detailing agent 304.

At block 208, the controller 124 controls elements of the printer 100, as described above, to form a layer of build material 122 on the build platform 118.

At block 210, the controller 124 controls the printer 100 to apply the determined patterns of fusing agent 302, of detailing agent 304, and of detailing agent 306 to the layer of build material 122.

At block 212, the controller 124 controls the printer 100 to apply fusing energy to the layer of build material 122 to cause portions of build material on which fusing energy is applied to heat up sufficiently to coalesce, and then solidify upon cooling. Blocks 208, 210, and 212, and then repeated until all of the layers of the 3D object being generated have been formed.

By applying a pattern of detailing agent 306 to each layer of build material in a suitable pattern prevents, or at least reduces, the amount of caking experienced by build material which is not intended to form part of a 3D object being generated. Accordingly, after processing of all of the layers, the 3D object may be more easily separated from non-solidified build material. This may help reduce the amount of effort or time needed to separate generated 3D objects, which may in turn help improve the throughput of 3D printing systems. Furthermore, by reducing or eliminating caking allows for simpler build material post-processing operations, which may in turn help reduce the cost of generating 3D objects.

In a further example, a printable fluid other than a detailing agent may be used to apply the pattern 306 to a layer of build material. For example, an anti-caking agent different from a detailing agent may be used. In this example, a third agent distributor, or printhead, may be provided in the printer 100 to print patterns of a de-caking agent on a layer of build material formed in a print zone 112. The de-caking agent may, for example, comprise a high percentage of water, such as greater than 98% of water, such that, upon the application of fusing energy, the anti-caking agent substantially evaporates from build material on which it is applied without unduly affecting build material on which it is applied. In this way, the anti-caking agent does not unduly affect the ability to reuse build material on which anti-caking agent was applied to generate further 3D objects.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine-readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A multi-jet fusion three-dimensional printing apparatus comprising:
    a recoater configured to form a first layer and a second layer of powder build material;
    a first agent distributor configured to selectively distribute first and second patterns of fusing agent on the first and second layers of powder build material, respectively;
    a second agent distributor configured to selectively distribute first and second patterns of detailing agent on the first and second layers of build material, respectively;
    an energy module configured to apply fusing energy to the first and second layers of powder build material; and
    a controller programmed to:
        obtain data corresponding to an object to be generated;
        determine first and second patterns of fusing agent to be applied to the first and second layers of powder build material to generate first and second layers of the object, respectively;
        determine first and second patterns of detailing agent to be applied to the first and second layers of powder build material, respectively, to reduce or prevent caking of build material that is not to form part of the object, the first pattern of detailing agent having a first checkered pattern, the second pattern of detailing agent having a second checkered pattern complementary to the first checkered pattern;
        control the recoater to form the first layer of powder build material;

control the first and second agent distributors to apply the determined first patterns of fusing agent and detailing agent to the first layer of powder build material;

control the recoater to form the second layer of powder build material;

control the first and second agent distributors to apply the determined second patterns fusing agent and detailing agent to the second layer of powder build material;

control the energy module to apply the fusing energy to the first and second layers of powder build material.

2. The apparatus of claim 1, wherein the controller is to further:

determine a type of powder build material to be used to generate the object; and determine a density or contone level of each of the first and second patterns of detailing agent based on the determined type of build material.

3. The apparatus of claim 1, further comprising a third agent distributor to selectively distribute a pattern of anti-caking agent, and wherein the controller is to control the third agent distributor to apply anti-caking agent in the first and second patterns.

4. A method comprising:

obtaining, by a controller of a multi-jet fusion three-dimensional printing apparatus, data corresponding to an object to be generated;

determining, by the controller, first and second patterns of fusing agent to be applied to first and second layers of powder build material to generate first and second layers of the object, respectively;

determining, by the controller, first and second pattern of detailing agent to be applied to the first and second layers of powder build material, respectively, to reduce or prevent caking of build material that is not to form part of the object, the first pattern of detailing agent having a first checkered pattern, the second pattern of detailing agent having a second checkered pattern complementary to the first checkered pattern;

controlling, by the controller, a recoater of the apparatus to form the first layer of powder build material;

controlling, by the controller, first and second agents distributor of the apparatus to apply the determined first patterns of fusing agent and detailing agent, respectively, to the first layer of powder build material;

controlling, by the controller, the recoater to form the second layer of powder build material;

controlling, by the controller, the first and second agent distributors to apply the determined second patterns of fusing agent and detailing agent, respectively, to the second layer of powder build material; and controlling, by the controller, an energy module of the apparatus to apply fusing energy to the first and second layers of powder build material.

5. The method of claim 4, further comprising:

determining, by the controller, a type of powder build material to be used to generate the object; and determining, by the controller, a density or contone level of each of the first and second patterns of detailing agent based on the determined type of build material.

6. The method of claim 4, further comprising:

controlling, by the controller, a third agent distributor to selectively distribute anti-caking agent in the first and second patterns.

7. A non-transitory computer-readable data storage medium storing instructions executable by a multi-jet fusion three-dimensional printing apparatus to perform processing comprising:

obtaining data corresponding to an object to be generated;

determining first and second patterns of fusing agent to be applied to first and second layers of powder build material to generate first and second layers of the object, respectively;

determining first and second pattern of detailing agent to be applied to the first and second layers of powder build material, respectively, to reduce or prevent caking of build material that is not to form part of the object, the first pattern of detailing agent having a first checkered pattern, the second pattern of detailing agent having a second checkered pattern complementary to the first checkered pattern and that impedes removal of the object;

controlling a recoater of the apparatus to form the first layer of powder build material;

controlling first and second agents distributor of the apparatus to apply the determined first patterns of fusing agent and detailing agent, respectively, to the first layer of powder build material;

controlling the recoater to form the second layer of powder build material;

controlling the first and second agent distributors to apply the determined second patterns of fusing agent and detailing agent, respectively, to the second layer of powder build material; and controlling an energy module of the apparatus to apply fusing energy to the first and second layers of powder build material.

8. The non-transitory computer-readable data storage medium of claim 7, wherein the processing further comprises:

determining a type of powder build material to be used to generate the object; and determining a density or contone level of each of the first and second patterns of detailing agent based on the determined type of build material.

9. The non-transitory computer-readable data storage medium of claim 7, wherein the processing further comprises:

controlling a third agent distributor to selectively distribute anti-caking agent in the first and second patterns.

* * * * *